(12) United States Patent
Conners et al.

(10) Patent No.: US 11,654,921 B2
(45) Date of Patent: May 23, 2023

(54) SYSTEMS AND METHODS FOR LIMITING DRIVER DISTRACTION

(71) Applicant: TOYOTA MOTOR ENGINEERING & MANUFACTURING NORTH AMERICA, INC., Plano, TX (US)

(72) Inventors: Joseph T. Conners, Royal Oak, MI (US); Ryan M. Wiesenberg, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 81 days.

(21) Appl. No.: 17/094,703

(22) Filed: Nov. 10, 2020

(65) Prior Publication Data

US 2022/0144284 A1   May 12, 2022

(51) Int. Cl.
*B60W 40/08* (2012.01)
*B60W 50/14* (2020.01)
*B60W 40/04* (2006.01)
*H04N 7/18* (2006.01)
*G06V 20/56* (2022.01)
(Continued)

(52) U.S. Cl.
CPC ............ *B60W 40/08* (2013.01); *B60W 40/04* (2013.01); *B60W 40/06* (2013.01); *B60W 50/14* (2013.01); *G06V 20/56* (2022.01); *G06V 20/597* (2022.01); *H04N 7/18* (2013.01); *B60W 2050/146* (2013.01); *B60W 2420/42* (2013.01); *B60W 2420/54* (2013.01); *B60W 2540/221* (2020.02);
(Continued)

(58) Field of Classification Search
CPC ...... B60W 40/08; B60W 40/04; B60W 40/06; B60W 50/14; G06V 20/597; G06V 20/56; H04N 7/18
USPC ......................................................... 348/148
See application file for complete search history.

(56) References Cited

U.S. PATENT DOCUMENTS

| | | | |
|---|---|---|---|
| 7,424,364 B2 * | 9/2008 | Gem ..................... | B60W 50/14 340/436 |
| 8,487,775 B2 * | 7/2013 | Victor .................. | A61B 5/7264 340/576 |

(Continued)

FOREIGN PATENT DOCUMENTS

WO      2019186385 A2    10/2019

*Primary Examiner* — Jonathan R Messmore
*Assistant Examiner* — Asmamaw G Tarko
(74) *Attorney, Agent, or Firm* — Haynes and Boone, LLP (57) ABSTRACT

Systems and methods for limiting driver distraction, such as improving (e.g., maintaining) driver attention to driving when driving distractions are detected, are provided. A system may include at least one sensor for determining an attention of a driver on a travel path and an interface module configured to reengage attention of the driver on the travel path. An image capturing device may detect an environment surrounding the vehicle. A logic device may determine whether the environment surrounding the vehicle includes an external distraction or whether the driver is distracted by an internal distraction. The at least one sensor may monitor the driver for a distracted behavior. The driver may be required to take an action when a distraction is determined. For example, the driver may interact with a driver monitoring system to verify reengagement to driving (e.g., by identifying a second vehicle on the roadway).

20 Claims, 6 Drawing Sheets

(51) Int. Cl.
*B60W 40/06* (2012.01)
*G06V 20/59* (2022.01)

(52) U.S. Cl.
CPC . *B60W 2540/229* (2020.02); *B60W 2554/402* (2020.02); *B60W 2555/00* (2020.02)

(56) References Cited

U.S. PATENT DOCUMENTS

| | | | | |
|---|---|---|---|---|
| 9,505,412 | B2 * | 11/2016 | Bai | B60W 40/08 |
| 9,607,510 | B1 | 3/2017 | DeLorean | |
| 9,688,281 | B2 * | 6/2017 | Parundekar | B60S 1/0818 |
| 9,771,083 | B2 * | 9/2017 | Gordon | B60W 40/08 |
| 9,928,433 | B1 * | 3/2018 | Chan | H04N 5/247 |
| 9,928,434 | B1 * | 3/2018 | Chan | B60W 40/08 |
| 9,952,046 | B1 * | 4/2018 | Blacutt | G06V 20/52 |
| 9,963,153 | B2 * | 5/2018 | An | B60W 30/08 |
| 10,002,300 | B2 | 6/2018 | Ryu et al. | |
| 10,257,805 | B2 | 4/2019 | Boss et al. | |
| 10,540,723 | B1 * | 1/2020 | Potter | G08B 21/02 |
| 10,592,785 | B2 * | 3/2020 | Zhu | B60W 40/08 |
| 10,657,397 | B2 * | 5/2020 | Ryu | B60W 40/08 |
| 10,800,424 | B2 * | 10/2020 | Sato | G06V 20/597 |
| 10,891,502 | B1 * | 1/2021 | Chan | B60W 40/08 |
| 11,254,316 | B2 * | 2/2022 | Herman | B60W 40/08 |
| 2009/0299857 | A1 * | 12/2009 | Brubaker | G06Q 30/0269 |
| | | | | 455/99 |
| 2014/0128146 | A1 * | 5/2014 | Story, Jr. | A63F 13/217 |
| | | | | 463/36 |
| 2016/0267335 | A1 * | 9/2016 | Hampiholi | B60K 28/06 |
| 2017/0124818 | A1 * | 5/2017 | Ullrich | G06F 3/167 |
| 2018/0025430 | A1 | 1/2018 | Perl et al. | |
| 2018/0075380 | A1 | 3/2018 | Perl et al. | |
| 2019/0147275 | A1 * | 5/2019 | Matsuura | B60W 50/14 |
| | | | | 348/148 |
| 2019/0156134 | A1 † | 5/2019 | Krishnan | |
| 2019/0156150 | A1 * | 5/2019 | Krishnan | G06V 20/46 |
| 2020/0018952 | A1 * | 1/2020 | Lewis | G06T 7/246 |
| 2020/0057487 | A1 * | 2/2020 | Sicconi | G06T 7/254 |
| 2021/0284176 | A1 * | 9/2021 | Wiesenberg | B60W 30/09 |

\* cited by examiner
† cited by third party

SYSTEMS AND METHODS FOR LIMITING DRIVER DISTRACTION

TECHNICAL FIELD

The present disclosure relates generally to vehicle safety features, and, more particularly, to systems and methods for limiting driver distraction, such as improving (e.g., maintaining) driver attention to driving when driving distractions are detected.

BACKGROUND

When driving, distracting events and objects may distract a driver while driving. Driver distraction may cause undesirable driving behaviors, such as erratic and unsafe driving, among others. In addition, driving distraction may result in property damage or injury, such as damage to one or more vehicles or other property and/or injury to drivers, passengers, or bystanders.

Therefore, a need exists in the art for systems and methods that addresses the above deficiencies, or at least offers an improvement, in the art. For example, a need exists for systems and methods that maintain or improve driver attention on the road during distracting events.

BRIEF SUMMARY

The present disclosure provides systems and methods for maintaining or improving driver attention on the road during distracting events. For example, systems and methods are provided that proactively identify or detect a distracting event or object and refocus or reengage attention of a driver on driving (e.g., on a travel path). In some embodiments, systems and methods may detect when a driver is approaching an external distraction (e.g., an advertising billboard, road construction, traffic accidents, and the like) or is being distracted when driving (e.g., cell phone use, breaking eye contact with road, driver inattention, etc.). Once an external distraction and/or driver inattention is detected, the driver may be required to maintain or reengage attention to the road and driving by interacting with the vehicle or a system in some manner. For example, the driver may be required to "tag" another vehicle on the roadway either verbally, with eye contact, or by interacting in some physical manner within the vehicle, among other interaction methods.

Various embodiments of the present disclosure include a system for limiting distraction of a driver of a vehicle. The system may include at least one sensor and an interface module. The at least one sensor may determine an attention of the driver on a travel path, such as a road or highway. The interface module may be configured to reengage attention of the driver on the travel path.

Various embodiments of the present disclosure include a system including an image capturing device, a logic device, and at least one sensor for determining an attention of a driver of a vehicle. The image capturing device may be configured to detect an environment surrounding the vehicle. The logic device may be configured to determine whether the environment surrounding the vehicle includes an external distraction. When the external distraction is determined, the logic device may be configured to request an action from the driver. The at least one sensor may monitor the driver for a distracted behavior.

Various embodiments of the present disclosure include a method of limiting driver distraction. The method may include determining an attention of a driver of a vehicle, such as determining an attention of the driver is away from a travel path. The method may include reengaging attention of the driver on the travel path through interaction of the driver with an interface module of the vehicle.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures.

DETAILED DESCRIPTION

The present disclosure provides systems and methods for limiting driver distraction, such as improving (e.g., maintaining) driver attention to a roadway or other travel path during external or internal driving distractions. A system may include at least one sensor for determining an attention of a driver on a travel path and an interface module configured to reengage attention of the driver on the travel path. An image capturing device may detect an environment surrounding the vehicle. A logic device may determine whether the environment surrounding the vehicle includes an external distraction or whether the driver is distracted by an internal distraction. The sensor may monitor the driver for a distracted behavior. The driver may be required to take an action when a distraction is determined. For example, the driver may interact with an interface module to verify reengagement to driving (e.g., by identifying a second vehicle on the roadway).

Figure 1:
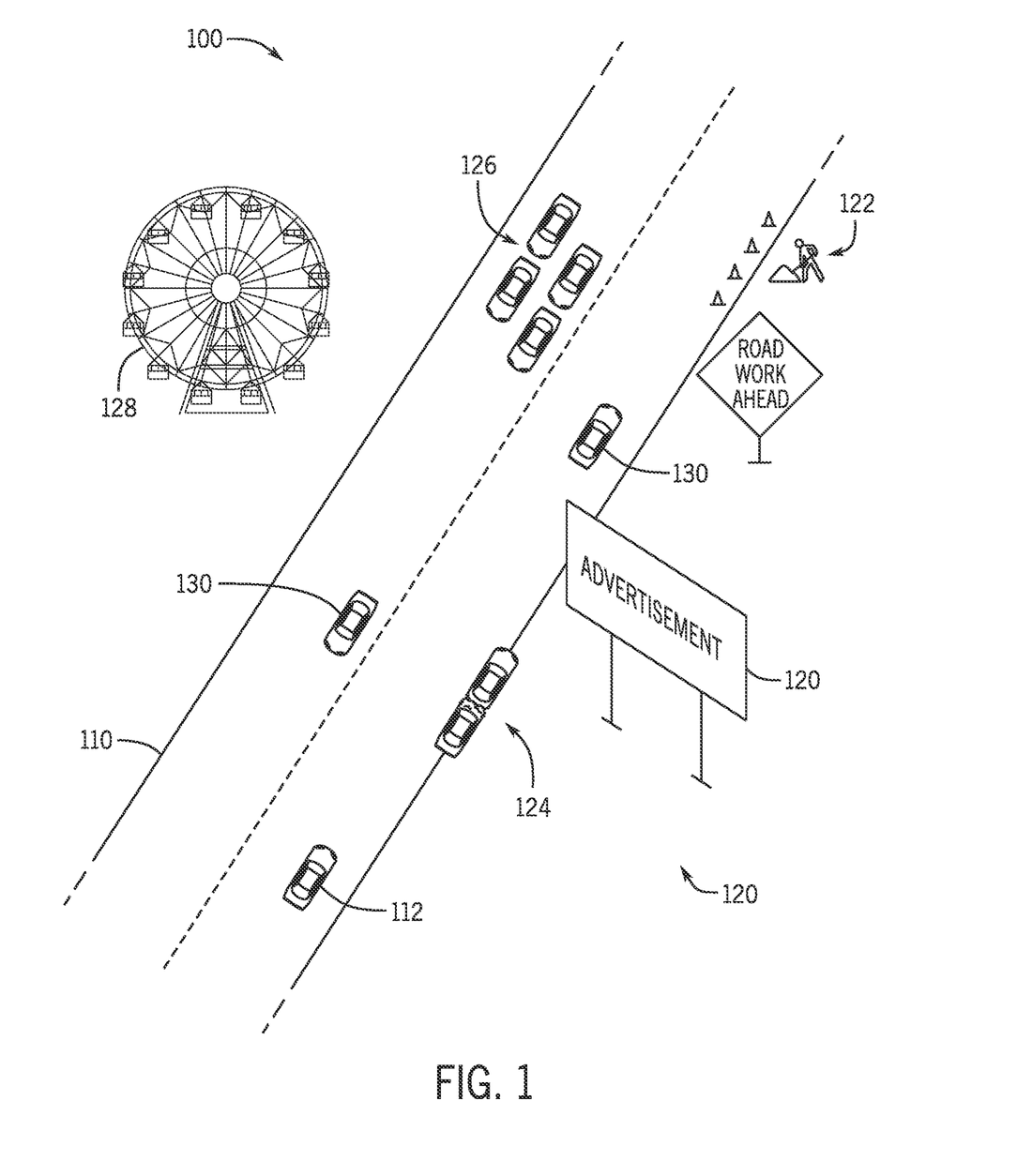
FIG. 1 is an illustration of a vehicle driving environment with one or more external distractions that can cause driver inattention while driving.

FIG. 1 is an illustration of a vehicle driving environment 100 with one or more external distractions 102 that can distract a driver while driving. Referring to FIG. 1, the vehicle driving environment 100 may include one or more, such as many, external distractions 102 that attract a driver's attention away from a travel path 110 (e.g., a highway, a roadway, a road, a pathway, etc.). For example, the environment surrounding a vehicle 112 may include any number and degree of advertising billboards 120, road construction 122, traffic accidents 124, road congestion 126, recreational/entertainment/sporting attractions 128, and other distracting events and objects near the travel path 110.

These and other external distractions 102 can distract a driver while driving, such as attracting a driver's attention away from the travel path 110. For example, rather than focusing on driving and the travel path 110 ahead, the driver of the vehicle 112 may focus attention on an advertising billboard 120, a traffic accident 124, road construction 122, or other roadside object or event. For instance, an advertising billboard 120 may include attention grabbing images, wording, and other features (e.g., lights, movements, etc.) that distract a driver for an extended time. Similarly, traffic accidents 124, road construction 122, and other roadside events or objects may excessively draw attention of the driver while driving, such as from curiosity or for entertainment, leading to rubbernecking or other distracted behavior. Inattention to driving and/or inattention to the travel path 110 may lead to undesirable driving behaviors, property damage, or injury.

With continued reference to FIG. 1, the driving environment 100 may change over time, creating new and/or different external distractions 102 for the driver. For example, one section of the travel path 110 may present a first set of external distractions, with another section of the travel path 110 presenting a second set of external distractions different than the first set of external distractions, such as different sections of the travel path 110 including differing amounts of advertising billboards 120, traffic accidents 124, road construction 122, traffic congestion 126, or other distractions. Similarly, the same section of the travel path 110 may have different external distractions 102 at different times (e.g., depending on the time of day, day of the week, time of year, etc.). For instance, a driver driving the same section of the travel path 110 may be presented with a different set of external distractions 102 from one day to another (e.g., weekday vs. weekend, Monday vs. Wednesday, etc.), from one time to another (e.g., morning vs. afternoon), or from one season of the year to another (e.g., summer vs. winter).

Figure 2:
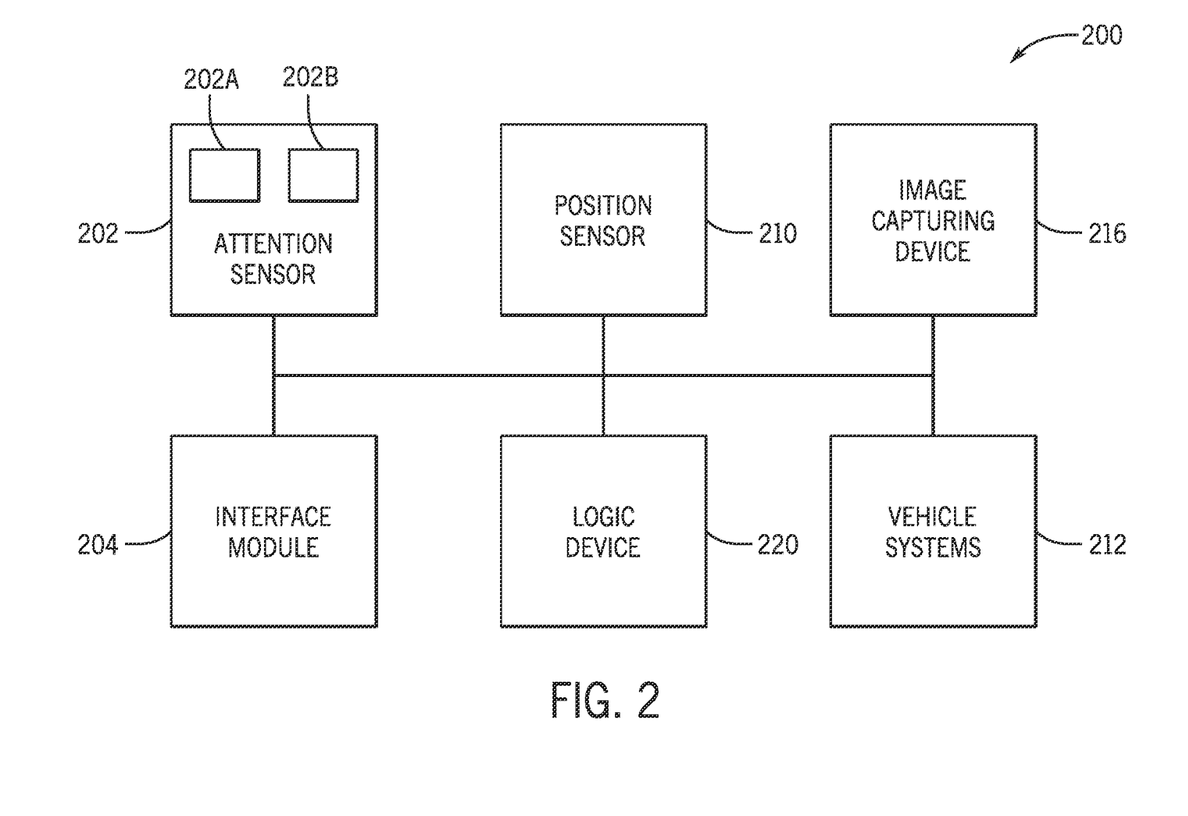
FIG. 2 is a diagram of a system for limiting driver inattention while driving, according to one or more embodiments of the disclosure.

FIG. 2 is a diagram of a system 200 for limiting driver distraction, such as inattention to driving, according to one or more embodiments of the disclosure. Referring to FIG. 2, the system 200 may include one or more features or components configured to identify or detect a distracting event or object (e.g., external distraction 102 or other distractions) and refocus or reengage attention of the driver of the vehicle 112 on driving (e.g., on the travel path 110). As shown, the system 200 includes at least one sensor for determining an attention of the driver on the travel path 110 (FIG. 2, "attention sensor 202") and an interface module 204, among other components.

The attention sensor 202 may be configured to monitor the driver for a distracted behavior, such as being configured to sense one or more characteristics indicative of a distracted driving behavior. In embodiments, the attention sensor 202 may sense whether attention of the driver is away from the travel path 110, such as on an external distraction 102. In embodiments, the attention sensor 202 may include a camera for detecting the one or more characteristics indicative of distracted driving. The camera may detect at least one of a facial characteristic of the driver indicative of the distracted behavior or a driving characteristic of the vehicle 112 indicative of the distracted behavior. For instance, the camera may include at least one of a driver monitoring camera 202A or a lane tracing camera 202B, among others.

The driver monitoring camera 202A may detect one or more facial characteristics of the driver indicative of distracted driving or inattention to driving. For example, the driver monitoring camera 202A may detect eye position, face direction, pupil dilation, eye movement, among others for determining attention of the driver on the travel path 110. The driver monitoring camera 202A may be used alone or in combination with other cameras or sensors (e.g., the lane tracing camera 202B) to determine driver distraction. The lane tracing camera 202B may detect a position and direction of the vehicle 112 within a lane of the travel path 110. For instance, the lane tracing camera 202B may monitor lane departure, lane tracking, and other driving characteristics of the vehicle 112 indicative of driver distraction. In embodiments, the lane tracing camera 202B may be used alone or in combination with the driver monitoring camera 202A, among other cameras or sensors, to determine driver attention or inattention on the travel path 110.

The interface module 204 may be configured to reengage attention of the driver on the travel path 110. As described herein, the attention sensor 202 may be configured to detect a verbal, a visual, or a physical interaction of the driver to reengage attention of the driver on the travel path 110. For example, the driver may verbally, visually, or physically interact with the vehicle 112 (e.g. with the attention sensor 202) to reengage attention of the driver on the travel path 110. Once a distracted driving behavior is detected by the attention sensor 202, the interface module 204 may require driver action, whether verbal, visual, or physical, to limit driver distraction and reengage attention of the driver on driving and the travel path 110. For instance, the interface module 204 may prompt action from the driver upon or after a distracted driving behavior is detected. In such embodiments, the attention sensor 202 may monitor the driver for the requested driver action. For example, the attention sensor 202 may be configured to detect an identification by the driver of a second vehicle 130 on the travel path 110 (see FIG. 1) to reengage attention of the driver on the travel path 110, as described below. The second vehicle 130 may be traveling in the same or opposite direction of the vehicle 112 along the travel path 110.

The driver may identify the second vehicle 130 verbally, visually, or physically. For instance, the driver may identify the second vehicle 130 verbally by vocalizing a requested characteristic of the second vehicle 130 (e.g., a color of the second vehicle 130, a type of the second vehicle 130, etc.). In such embodiments, the attention sensor 202 may include a microphone configured to detect the driver's vocalization of the requested characteristic. In embodiments, the driver may identify the second vehicle 130 visually with eye contact. For example, the driver monitoring camera 202A may detect whether the driver is looking at the second vehicle 130, whether the driver is visually tracking the second vehicle 130, or the like. In embodiments, the driver may interact in some physical manner with the vehicle 112 to identify the second vehicle 130. For instance, the driver may engage one or more buttons, dials, or other tactile interface to identify the second vehicle 130 and confirm attention to the travel path 110. As a result, the system 200 may allow the driver to "tag" the second vehicle 130 in many ways.

With continued reference to FIG. 2, the system 200 may include other components or modules. For example, the system 200 may include a second sensor for determining a position of the second vehicle 130 near the vehicle 112, such as on the travel path 110 (FIG. 2, "position sensor 210"). The position sensor 210 may be a camera, laser, radar, or any combination thereof for detecting the position of the second vehicle 130 on or near the travel path 110. In embodiments, the position sensor 210 may detect one or more characteristics of the second vehicle 130 (e.g., color, type, etc.). The system 200 may also include one or more vehicle systems 212. For example, the system 200 may include a GPS system, a vehicle dynamics system, an audio system, a display system, a communications system, and/or a user interface system, among others, of vehicle 112.

In some embodiments, the system 200 may include an image capturing device 216 configured to detect the environment surrounding the vehicle 112. The image capturing device 216 may include one or more cameras or sensors that detect one or more external distractions 102 near the vehicle 112. For example, the image capturing device 216 may monitor the travel path 110 for identifiable external distractions 102 (e.g., advertising billboards 120, traffic accidents 124, road construction 122, etc.). The image capturing device 216 may be used to classify external distractions 102, such as distinguishing between an advertising billboard 120, a traffic accident 124, or road construction 122, among other external distractions 102, as well as associating a severity or degree to each external distraction 102 (e.g., minor vs. major traffic accident, limited vs. expansive road construction 122, etc.). In embodiments, the image capturing device 216 may be used to verify data received from an external source (e.g., a map, a traffic service, or a network) to identify external distractions 102. In some embodiments, the image capturing device 216 may be omitted, and the external distractions 102 may be identified using the external source (e.g., the map, traffic service, or network) exclusively.

In some embodiments, multiple vehicles may be linked together in a network, or data from multiple vehicles may be uploaded to a network for access by other vehicles. As a result, one or more vehicles can build up a map of distracting events/objects and their location along the travel path 110. For example, the driver can identify a distracting event/object while driving, or the system 200 may determine a distracting event/object, such as automatically, as the system 200 monitors the driver for distracted behavior. In this way, a map of external distractions 102 may be adaptively created and modified for the travel path 110. In some embodiments, the map of external distractions 102 may be adaptively created and modified for the driver, based on the driver's personal distraction characteristics (e.g., more easily distracted with certain types of billboards 120, not easily distracted with respect to road construction 122 or traffic accidents 124, etc.). For example, the driver's reactions may be compared against those of other drivers to modify the map of external distractions 102 and/or define the driver's personal distraction characteristics.

As shown in FIG. 2, the system 200 may include a logic device 220. The logic device 220 may be any controller, processor, module, circuitry, or device configured to perform one or more operations. The logic device 220 may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of the attention sensor 202, position sensor 210, interface module 204, image capturing device 216, vehicle systems 212, and/or other elements of system 200, for example. Such software instructions may also implement methods for processing images and/or other sensor signals or data, determining sensor information, providing user feedback (e.g., through a user interface), querying devices for operational parameters, selecting operational parameters for devices, or performing any of the various operations described herein (e.g., operations performed by logic devices of various devices of system 200).

The logic device 220 may be communicatively connected to the attention sensor 202, the interface module 204, the position sensor 210, the vehicle systems 212, and the image capturing device 216. The logic device 220 may be configured to receive data from at least one sensor of system 200. For example, the logic device 220 may receive data or other sensor signals from the image capturing device 216, attention sensor 202, position sensor 210, interface module 204, vehicle systems 212, or any combination thereof. In embodiments, the logic device 220 may receive data from a map, a traffic service, or a network, among other external sources identifying the type and location of one or more external distractions 102. Depending on the application, the logic device 220 may receive and transmit data over wired or wireless communication.

Based on data received, the logic device 220 may be configured to determine a distraction, such as whether the environment surrounding the vehicle 112 includes an external distraction 102. For instance, the logic device 220 may determine that one or more external distractions 102 exist based on data received from the attention sensor 202 monitoring the driver and/or the image capturing device 216 monitoring the environment surrounding the vehicle 112. For example, the logic device 220 may monitor, through the attention sensor 202, whether the driver's attention deviates from the travel path 110 above a threshold time, such as above a preset deviation time. In embodiments, the logic device 220 may monitor, through the attention sensor 202, whether the driver's attention deviates from the travel path 110 above a threshold magnitude, such as above a preset deviation magnitude or degree by the which the driver's eyes or head turns in response to the external distraction 102. Additionally, or alternatively, the logic device 220 may monitor the environment surrounding the vehicle 112 by continuously or near-continuously analyzing data received from the image capturing device 216 to identify one or more external distractions 102. In some embodiments, the logic device 220 may determine if an internal distraction exists, as detailed below. For example, the logic device 220 may determine if the driver is engaging in an activity that diverts attention from driving (e.g., texting, adjusting vehicle systems 212, etc.).

In some embodiments, the logic device 220 may intelligently determine whether a distraction exists or whether the distraction warrants driver action to verify driver attention on the travel path 110. For example, the logic device 220 may determine whether the driver has already seen the external distraction 102 (e.g., has already seen the advertising billboard 120, road construction 122, or traffic accident 124, for example). In embodiments, the logic device 220 may determine whether the driver has previously seen the external distraction 102 within a certain time period (e.g., on the same day, within the same hour, within a range of days, etc.), such as seeing the same external distraction 102 in the same location along the same travel path or seeing a similar external distraction 102 along a different travel path. If the driver has already seen the same or similar external distraction 102, the logic device 220 may determine that an external distraction 102 does not exist for the driver, that the external distraction 102 does not warrant driver action, that the external distraction 102 warrants a different driver action than the previously-requested driver action, or that the external distraction 102 warrants the same action from the driver.

In some embodiments, the logic device 220 may determine a previous reaction or distracted behavior of the driver to the same or similar distraction. For instance, previous reactions or distracted behavior analysis of the driver may be stored in memory, and the logic device 220 may retrieve the stored reactions or analysis. Based on the driver's previous reaction(s) or behavior(s), the logic device 220 may determine that a distraction does not exist for the driver (e.g., the driver never or rarely exhibits distracted driving behavior for the same or similar distraction), that the distraction does not warrant driver action, or that the distraction warrants driver action.

The logic device 220 may intelligently determine the presence of a distraction or the requested driver action based upon on one or more factors. For example, the logic device 220 may apply a weighting factor in determining the distraction. The factors weighed by the logic device 220 may include, without limitation, the severity of the distraction or the distraction intensity, driver interest in the distraction, the time between exposure to the same or similar distraction, the last distraction of the driver, the time since last focus request, the normality of the distraction, previous driver reaction to the distraction, and the visibility of the distraction to the driver, among others, or any combination thereof. In some embodiments, the logic device 220 may apply one or more machine learning algorithms in determining whether a distraction exists, such as supervised learning, unsupervised learning, or reinforcement learning algorithms. Non-limiting examples of machine learning algorithms that may be applied to facilitate determining whether an external distraction 102 exists include logistic regression, decision tree, support vector machine, Naive Bayesian models, random forest, or other algorithms. As a result, the system 200 may include one or more smart features to adapt the system 200 to the driver or to the travel path 110.

When a distraction is determined, the logic device 220 may be configured to request an action from the driver through the interface module 204. For example, the logic device 220 may request, through the interface module 204, the driver to "tag" an object on the travel path 110, such as second vehicle 130 of FIG. 1, either verbally, with eye contact, or by interacting in some physical manner with vehicle 112, as described herein. The logic device 220 may monitor the driver for the requested action through the attention sensor 202. For example, the logic device 220 may monitor verbal, visual, and/or physical movements or interactions of the driver to reengage attention of the driver on the travel path 110. As a result, driver attention to the travel path 110 may be reinforced or maintained when a distraction is detected. The driver may be prompted in one or more manners to provide an action. For instance, an audible tone and/or message may be played, a visual cue may be displayed (e.g., on the dashboard, in a head-up display, etc.), or a physical feedback may be initiated (e.g., steering wheel vibration, seat vibration, etc.), or any combination thereof, to prompt driver action.

Figure 3:
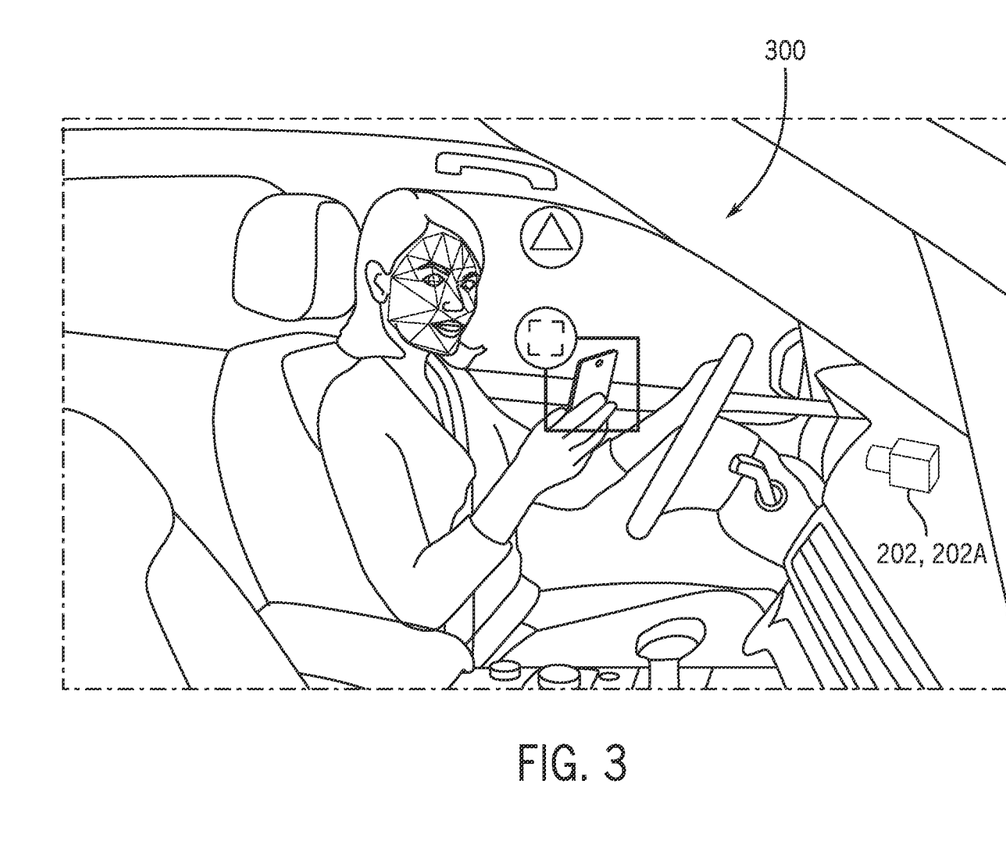
FIG. 3 is an illustration of a driver monitoring system, according to one or more embodiments of the disclosure.

FIG. 3 is an illustration of a driver monitoring system 300, according to one or more embodiments of the disclosure. The driver monitoring system 300 may be used to monitor driver behavior. For example, the driver monitoring system 300 may include attention sensor 202, described above, to sense one or more facial characteristics of the driver indicative of a distracted behavior. Specifically, the driver monitoring system 300 may monitor attention of the driver on the travel path 110. For instance, the driver monitoring system 300 may track eye position and eye movement, among other facial characteristics, to determine driver distraction. The driver monitoring system 300 may determine driver distraction to external distractions 102 (e.g., advertising billboards 120, road signs, traffic accidents 124, road construction 122, or other external distracting objects or activities), similar to the embodiments described above.

In embodiments, the driver monitoring system 300 may determine driver distraction to other distractions. For example, and without limitation, the driver monitoring system 300 may determine driver distraction from any activity that diverts attention from driving, such as talking or texting on a phone, eating and drinking, fiddling with one or more vehicle systems 212 (e.g., stereo, HVAC, or navigation system), talking to passengers in the vehicle 112, and the like. These and other internal distractions may attract a driver's attention away from driving, similar to the external distractions 102 discussed above. When internal distractions are determined, the driver may be prompted or requested to provide an action to limit driver distraction and reengage attention of the driver on driving and the travel path 110, similar to the driver action described above when external distractions 102 are determined.

Figure 4:
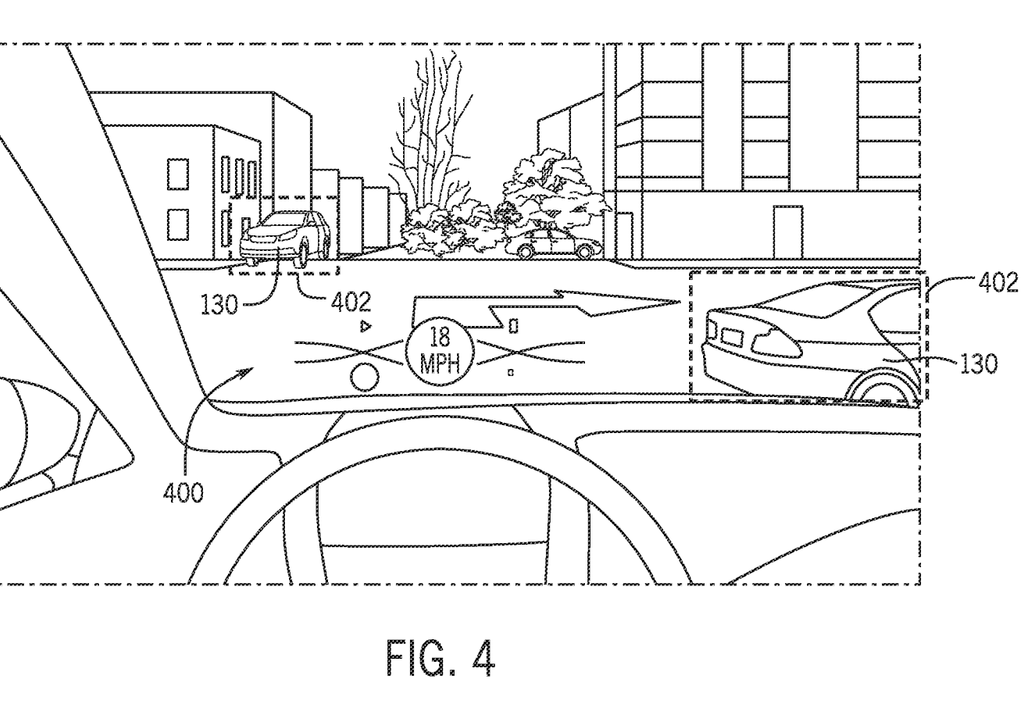
FIG. 4 is an illustration of a head-up display for a vehicle, according to one or more embodiments of the disclosure.

FIG. 4 is an illustration of a head-up display (HUD) 400 for vehicle 112, according to one or more embodiments of the disclosure. Referring to FIG. 4, the HUD 400 may present images, information, commands, prompts, or other data to the driver and within the field of view of the driver. For example, the HUD 400 may present speedometer, tachometer, navigation, and night vision system displays, among other system displays, or any combination thereof. The HUD 400 may allow the driver to view data without requiring the driver to look away from the travel path 110. For instance, the HUD 400 may allow the driver to view information with the driver's head or eyes positioned up and looking forward, instead of angled down looking at one or more lower instruments or gauges. The HUD 400 may be embodied within the dash of the vehicle 112, such that the displayed information is projected onto the windshield for viewing by the driver, although other configurations are contemplated that present information to the driver within the driver's field of view.

In embodiments, the interface module 204 of system 200 may include HUD 400. The HUD 400 may include one or more features configured to reengage attention of the driver on the travel path 110 when a distraction is detected. In one embodiment, the HUD 400 may highlight the second vehicle 130, such as in one or multiple manners (e.g., by an outline 402 around the second vehicle 130, by a marker adjacent to the second vehicle 130, or the like). When the second vehicle 130 is highlighted in the HUD 400, the system 200 may prompt the driver to identify the second vehicle 130. For example, the driver monitoring camera 202A may detect whether the driver is looking at the second vehicle 130 highlighted in the HUD 400. Additionally, or alternatively, a microphone may detect the driver vocalizing the color (or another requested characteristic) of the second vehicle 130 highlighted in the HUD 400.

Figure 5:
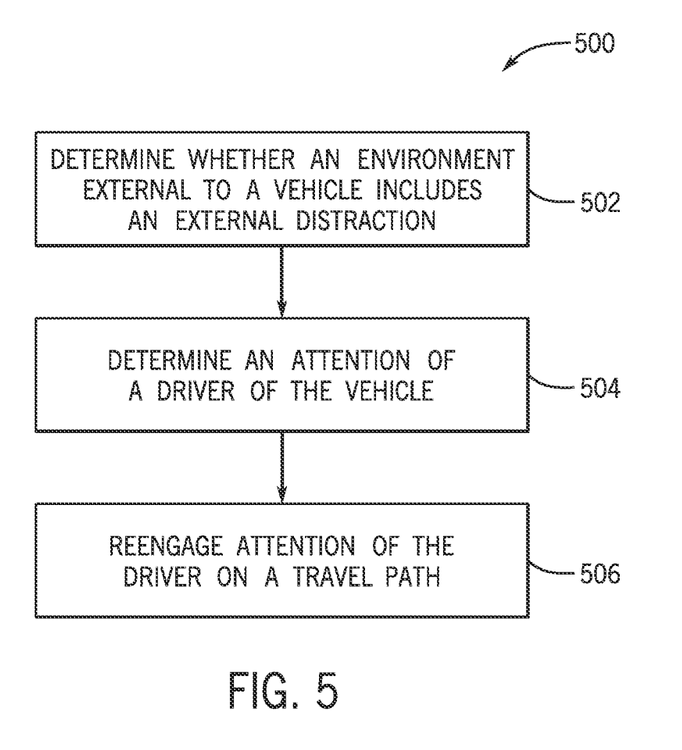
FIG. 5 is a flowchart of a method of limiting driver inattention during distracting events, according to one or more embodiments of the disclosure.

FIG. 5 is a flowchart of a method 500 of limiting driver inattention during distracting events, according to one or more embodiments of the disclosure. Method 500 may be implemented using various systems, such as system 200 described above. Method 500 is illustrated as a set of operations or steps and is described with reference to FIGS. 1-4, although method 500 may be applied to other embodiments not illustrated in FIGS. 1-4. One or more steps that are not expressly illustrated in FIG. 5 may be included before, after, in between, or as part of the illustrated steps.

In Block 502, method 500 may include determining whether an environment surrounding a vehicle includes an external distraction, such as a billboard, a traffic accident, road construction, or other roadside object or event that tends to distract a driver while driving. For example, an image capturing device may detect the environment surrounding the vehicle, such as through one or more cameras or sensors. In embodiments, data from a network, a traffic service, a map, or other external source may be analyzed to determine external distractions near the vehicle. For instance, the location of the vehicle may be checked against external distractions identified on a map, by a traffic service, or a network, such as by other drivers, by the driver previously, or the like.

In Block 504, the method 500 includes determining an attention of the driver of the vehicle. Attention of the driver may be determined using facial recognition. For example, a driver monitoring camera (or other facial recognition system) may detect a facial characteristic of the driver, such as eye position, eye movement, face direction, head movement, etc. The detected facial characteristic may be used to verify the existence of an external distraction against a map of external distractions, or the detected facial characteristic may be used to determine driver distraction. For instance, a detection of driver distraction may indicate an external distraction near the vehicle. In embodiments, the driver monitoring camera may monitor driver distraction to objects or other distractions internal to the vehicle, including, for example, talking or texting on a phone, eating, drinking, adjusting one or more vehicle systems (e.g., stereo, HVAC, navigation, etc.), diverting attention to persons or objects within the passenger compartment of the vehicle, and the like.

In embodiments, Block 504 may include sensing one or more characteristics indicative of a distracted driving behavior. In one example, a lane tracing camera my monitor lane departure, lane tracking, and other driving characteristics of the vehicle indicative of driver distraction. In embodiments, the attention of the driver may be determined using other sensors and systems. For example, the attention of the driver may be determined by monitoring a speed, braking, or other driving parameter or characteristic. For instance, fluctuating speed or extreme braking may indicate that the driver is driving distracted.

In Block 506, method 500 includes reengaging attention of the driver on a travel path, such as through interaction of the driver with an interface module of the vehicle. Block 506 may include receiving verbal, visual, or physical interaction of the driver to maintain attention of the driver on the travel path. For example, Block 506 may include detecting an identification of a second vehicle by the driver. The driver may identify a requested characteristic of the second vehicle, such as the color, type, or other characteristic of the second vehicle. In embodiments, the driver may identify the second vehicle through eye contact, such as by looking at the second vehicle for a set period, as detected by the driver monitoring camera. The driver may identify the second vehicle in other manners (e.g., buttons, dials, etc.). As a result, an action by the driver may be required when an external or internal distraction is determined, with one or more sensors monitoring the driver for a distracted behavior and verifying the action is taken by the driver.

Although identification of a second vehicle is discussed, Block 506 may include reengaging attention of the driver on the travel path through identification of another object on or adjacent to the travel path in a manner that would increase or promote attention to the travel path and to driving. Non-limiting examples include traffic signs (e.g., speed limit, information, warning, or regulatory signs, etc.), road medians, and road surface markings. In embodiments, the interface module may include a HUD, the HUD identifying the second vehicle or other object for identification. For example, the HUD may outline or otherwise mark the second vehicle or object to be identified by the driver.

Figure 6:
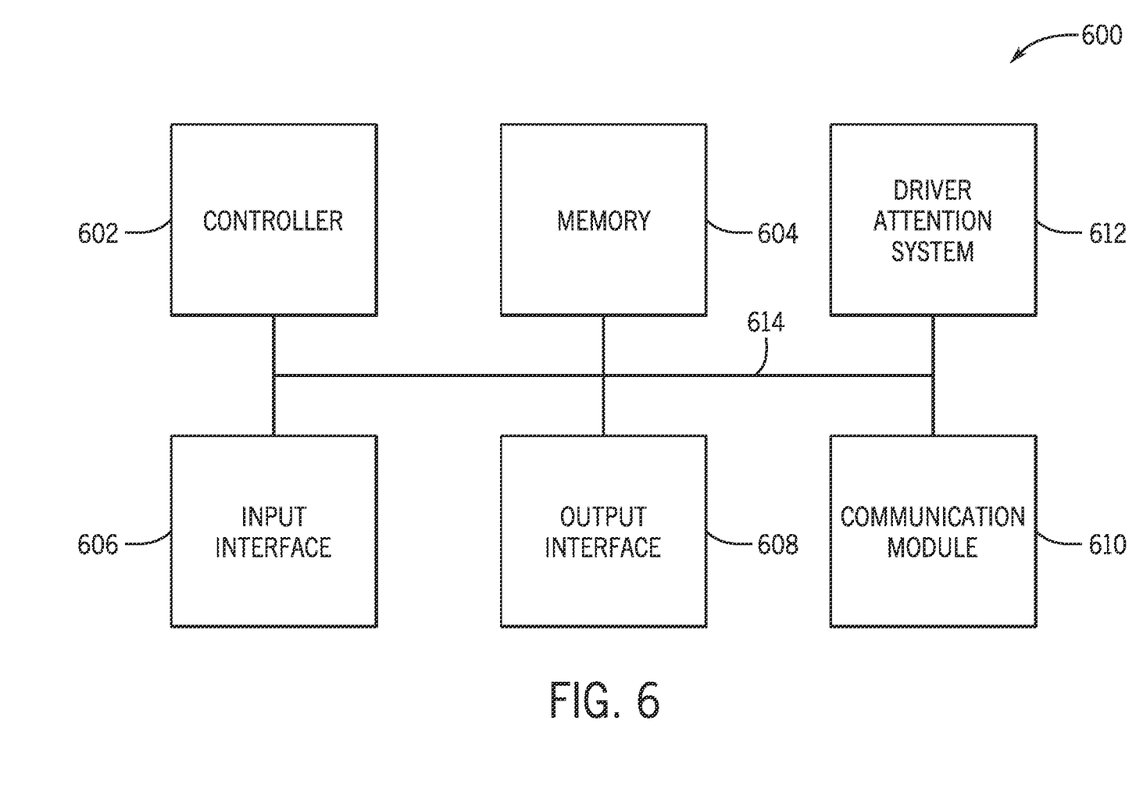
FIG. 6 is a diagram illustrating an example computing or processing system, according to one or more embodiments of the disclosure.

FIG. 6 is a diagram illustrating an example computing or processing system 600 in which embodiments of the present disclosure may be implemented. For example, system 200 of FIGS. 2-4, as described above, may be implemented using system 600. In some embodiments, method 500 of FIG. 5, as described above, may be implemented using system 600. Computing or processing system 600 can be or include a computer, phone, PDA, tablet, server, controller, or any other type of electronic device. Such an electronic device includes various types of computer readable media and interfaces for various other types of computer readable media. As shown in FIG. 6, system 600 includes a controller 602, a memory 604, an input interface 606, an output interface 608, and a communications module 410.

The controller 602, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The controller 602 may be configured to interface and communicate with the various other components of the processing system 600 to perform such operations. For example, the controller 602 may be configured to receive and process map, position, distraction, facial monitoring, and vehicle dynamics data, among others, received from a network and/or one or more sensors (e.g., driver monitoring camera 202A, position sensor 210, etc.), store the data in the memory 604, and/or retrieve stored data from the memory 604.

The controller 602 may include combinations of hardware and software processing functionality and may be provided with/in and/or communicatively attached to other components to execute appropriate instructions, such as software instructions and/or processing parameters stored in the memory 604. In various embodiments, the controller 602 may be configured to execute software instructions stored in the memory 604 to perform various methods, processes, or operations in the manner described herein.

The memory 604 includes, in one embodiment, one or more memory devices configured to store data and information, including magnetic flux data and position information. The memory 604 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the controller 602 may be configured to execute software instructions stored in the memory 604 to perform method 500 and process steps and/or operations. The controller 602 may be configured to store data in the memory 604.

The input interface 606 includes, in one embodiment, a user input and/or an interface device, such as one or more knobs, buttons, slide bars, keyboards, sensors, cameras, and/or other devices, that are adapted to generate an input control signal. The controller 602 may be configured to sense the input control signals from the input interface 606 and respond to any sensed input control signals received therefrom. The controller 602 may be configured to interpret such a input control signal as a value, as generally understood by one skilled in the art. In one embodiment, the input interface 606 may include a control unit (e.g., a wired or wireless handheld control unit) having push buttons adapted to interface with a user and receive user input control values. In one implementation, the push buttons of the control unit may be used to control various system functions.

The output interface 608 may enable, for example, the output of data or other information. The output interface 608 may include, for example, one or more display devices, such as monitors or other visual displays (e.g., light emitting diode (LED) displays, liquid crystal displays (LCDs), head-up displays (HUDs), or other types of displays). Some implementations include devices such as a touchscreen that function as both input and output components. The controller 602 may be configured to render data and information on the output interface 608. For example, the controller 602 may be configured to render data on the output interface 608, such as data stored in the memory 604.

In some embodiments, various components of system 600 may be distributed and in communication with one another over a network. In this regard, system 600 may include a communications module 410 configured to facilitate wired and/or wireless communication among various system components over the network. Such a network may include, for example, a local area network ("LAN"), such as an Intranet, or a wide area network ("WAN"), such as the Internet.

As shown, system 600 may include driver attention system 612. Driver attention system 612 may be similar to system 200 of FIGS. 2-4, described above. For example, the driver attention system 612 may include one or more sensors or cameras configured to sense, acquire, monitor, or otherwise determine an attention of the driver of a vehicle, such as the driver's attention to an external or internal distraction.

In some embodiments, various components of system 600 may be communicatively connected via a system communications bus 614. Bus 614 collectively represents all system, peripheral, and chipset buses that communicatively connect the numerous devices of system 600. For instance, bus 614 may communicatively connect controller 602, memory 604, input interface 606, and output interface 608 together.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A system for limiting distraction of a driver of a vehicle, the system comprising:
    at least one sensor for determining an attention of the driver on a travel path; and
    an interface module configured to reengage the attention of the driver on the travel path, wherein the interface module comprises a logic device configured to:
        identify one or more external distractions in an environment surrounding the vehicle based on one or more images of the environment surrounding the vehicle,
        determine a distracted driving behavior of the driver based on the attention of the driver away from the travel path and on the one or more external distractions in the environment surrounding the vehicle, and
        request an action from the driver based on the determined distracted driving behavior of the driver, the action requiring the driver to interact with the interface module to reengage the attention of the driver on the travel path, wherein the action is different than a previously-requested driver action to the same or similar external distraction.

2. The system of claim 1, wherein the at least one sensor is configured to detect a verbal, a visual, or a physical interaction of the driver to reengage attention of the driver on the travel path.

3. The system of claim 1, wherein the interface module comprises a head-up display of the vehicle.

4. The system of claim 1, further comprising a second sensor for determining a position of a second vehicle on the travel path, wherein the at least one sensor detects an identification of the second vehicle by the driver to reengage attention of the driver on the travel path.

5. The system of claim 1, wherein:
the at least one sensor comprises a camera for detecting one or more characteristics indicative of the distracted driving behavior; and
the camera detects at least one of a facial characteristic of the driver indicative of the distracted driving behavior or a driving characteristic indicative of the distracted driving behavior.

6. The system of claim 1, further comprising an image capturing device configured to capture the one or more images of the environment surrounding the vehicle.

7. The system of claim 1, wherein the logic device is configured to:
receive data from at least one of an image capturing device, a map, a traffic service, or a network; and
identify the one or more external distractions in the environment surrounding the vehicle based on the data.

8. The system of claim 7, wherein the logic device is configured to request the action from the driver through the interface module.

9. The system of claim 1, wherein the action is unique to the driver based on an analysis of previous reactions of the driver.

10. A system comprising:
an image capturing device configured to capture one or more images of an environment surrounding a vehicle;
at least one sensor configured to determine an attention of a driver of the vehicle; and
a logic device configured to:
identify one or more external distractions in the environment surrounding the vehicle based on the one or more images,
determine a distracted behavior of the driver based on the attention of the driver away from a travel path and on the one or more external distractions in the environment surrounding the vehicle, and
request an action from the driver based on the determined distracted behavior of the driver, the action requiring the driver to interact with the interface module to reengage the attention of the driver on the travel path, wherein the action is different than a previously-requested driver action to the same or similar external distraction.

11. The system of claim 10, further comprising a second sensor for determining a position of a second vehicle near the vehicle, wherein the logic device is configured to determine an identification of the second vehicle by the driver.

12. The system of claim 11, wherein the identification of the second vehicle by the driver comprises a verbal or visual identification of the second vehicle.

13. The system of claim 10, wherein:
the at least one sensor comprises one or more cameras for detecting one or more facial characteristics of the driver indicative of the distracted behavior; and
the one or more cameras verify the action is taken by the driver.

14. The system of claim 10, wherein:
the logic device is configured to apply a weighting factor in identifying the one or more external distractions; and
the weighting factor comprises a previous driver reaction to the same or similar external distraction.

15. The system of claim 10, wherein the action is unique to the driver based on an analysis of previous reactions of the driver.

16. A method of limiting driver distraction, the method comprising:
determining an attention of a driver of a vehicle on a travel path;
identifying one or more external distractions in an environment surrounding the vehicle based on one or more images of the environment surrounding the vehicle;
determining a distracted behavior of the driver based on the attention of the driver away from the travel path and on the one or more external distractions in the environment surrounding the vehicle; and
reengaging attention of the driver on a travel path through interaction of the driver with an interface module of the vehicle, wherein the reengaging comprises requesting an action from the driver that reengages the attention of the driver on the travel path, the action requiring the driver to interact with the interface module to reengage the attention of the driver on the travel path, wherein the action is different than a previously-requested action to the same or similar external distraction.

17. The method of claim 16, wherein the identifying the one or more external distractions in the environment surrounding the vehicle comprises determining whether the environment comprises a billboard, a traffic accident, or road construction.

18. The method of claim 16, wherein the determining the attention of the driver comprises detecting one or more facial characteristics of the driver indicative of the distracted behavior.

19. The method of claim 18, wherein the receiving the verbal, visual, or physical interactions of the driver comprises detecting an identification of a second vehicle by the driver.

20. The method of claim 16, wherein the reengaging attention of the driver on the travel path comprises receiving verbal, visual, or physical interactions of the driver to reengage the attention of the driver on the travel path.

* * * * *